United States Patent
Miglizzi

[11] Patent Number: 5,284,234
[45] Date of Patent: Feb. 8, 1994

[54] CENTRIFUGAL CLUTCH

[76] Inventor: Anthony Miglizzi, 1537 McKinley St., Unit 19, Azusa, Calif. 91702

[21] Appl. No.: 35,302

[22] Filed: Mar. 22, 1993

[51] Int. Cl.$^5$ ............................................. F16D 43/08
[52] U.S. Cl. .............................. 192/105 C; 192/70.24; 192/103 A; 192/89 R
[58] Field of Search ........... 192/105 C, 103 A, 103 R, 192/89 RW, 70.24

[56] References Cited

U.S. PATENT DOCUMENTS

| | | | |
|---|---|---|---|
| 865,449 | 9/1907 | Sturtevant | 192/105 C |
| 1,941,588 | 1/1934 | Vail | 192/105 C X |
| 1,979,880 | 11/1934 | Heinrich | 192/105 C |
| 2,003,322 | 6/1935 | Vail | 192/105 C |
| 2,108,969 | 2/1938 | Lewis | 192/105 C |
| 3,291,274 | 12/1966 | Wyman | 192/105 C |
| 4,732,251 | 3/1988 | Tipton | 192/105 C X |
| 5,014,841 | 5/1991 | Gillespie | 192/105 C |
| 5,033,598 | 7/1991 | Tipton . | |

Primary Examiner—Rodney H. Bonck
Assistant Examiner—Andrea Pitts

[57] ABSTRACT

A centrifugal clutch comprising an elongate rotary power input shaft with front and rear ends, a plurality of axially spaced plates including a front end plate in axial fixed rotary driving engagement with the shaft, a rear end plate in axially shiftable and rotary driving engagement with the shaft, and axially shiftable intermediate plates in rotary driving relationship with the shaft, an elongate rotary power output part in radial outward spaced relationship about the plates; a plurality of axially spaced disks in axially shiftable and rotary driving engagement with the output part and in leafed interengaged relationship with the plates; a plurality of actuating weights spaced circumferentially about the shaft on radial planes and forward of the front plate, each weight has a radially outwardly and axially rearwardly disposed pivot point pivotally engaged in a radially inwardly and axially forwardly disposed pivot seat on the front plate; and, elongate tow members with rear ends coupled with the rear plate and front ends pivotally coupled with the weights at a point spaced axially forward and radially inward of the pivot points thereof.

10 Claims, 4 Drawing Sheets

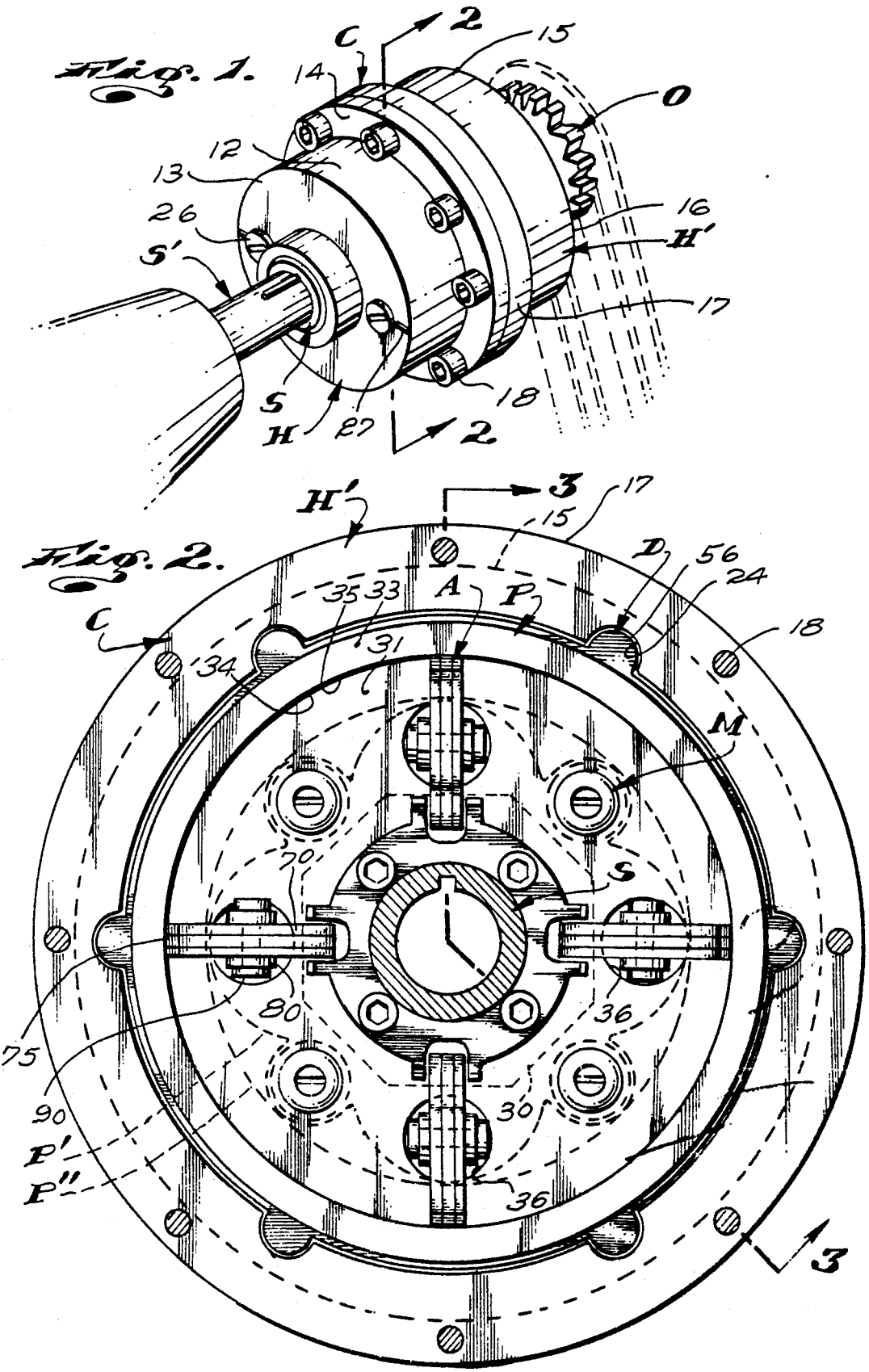

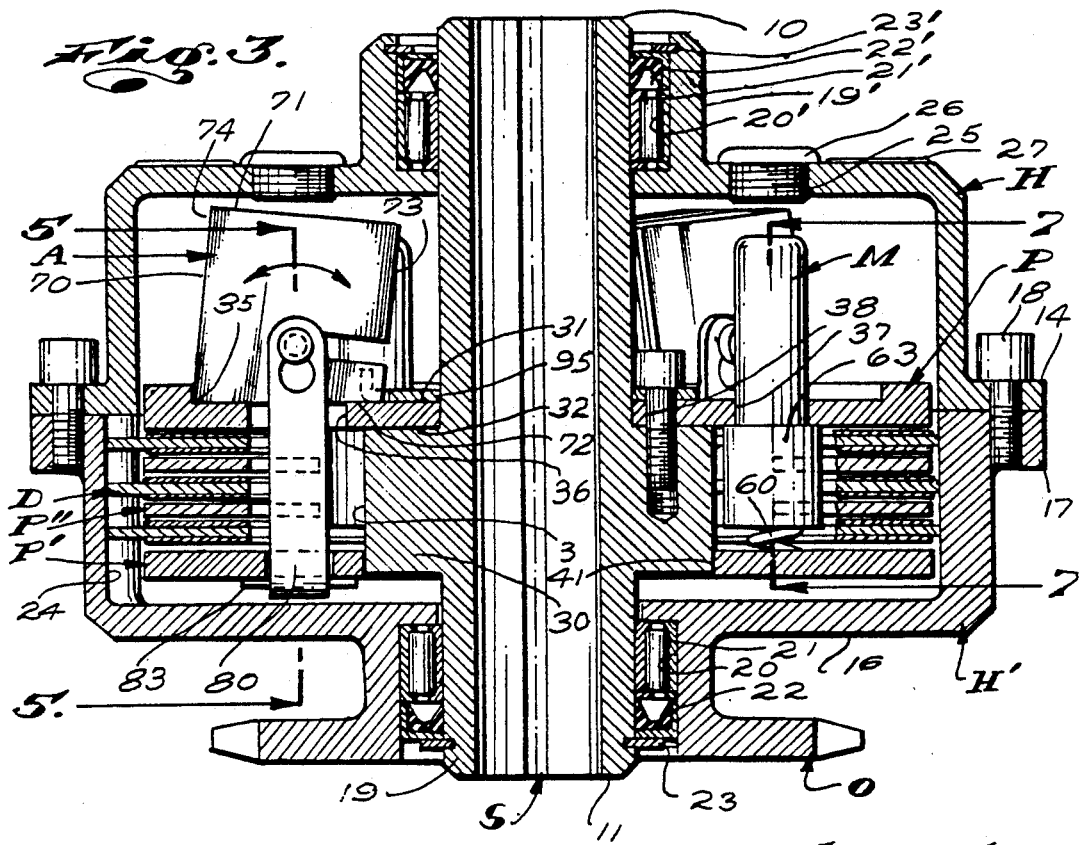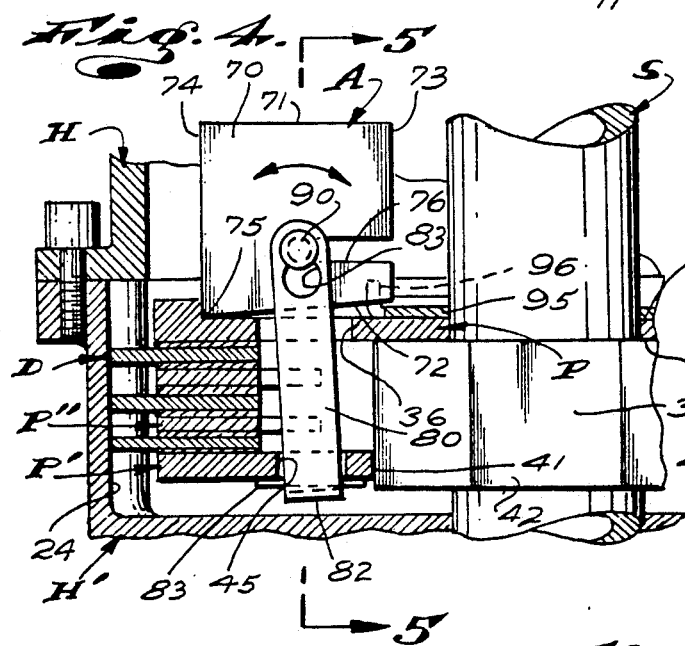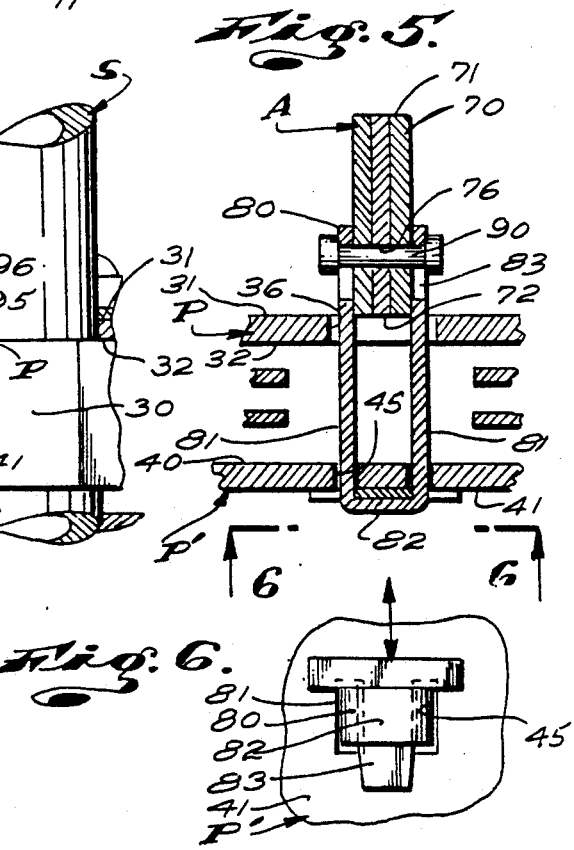

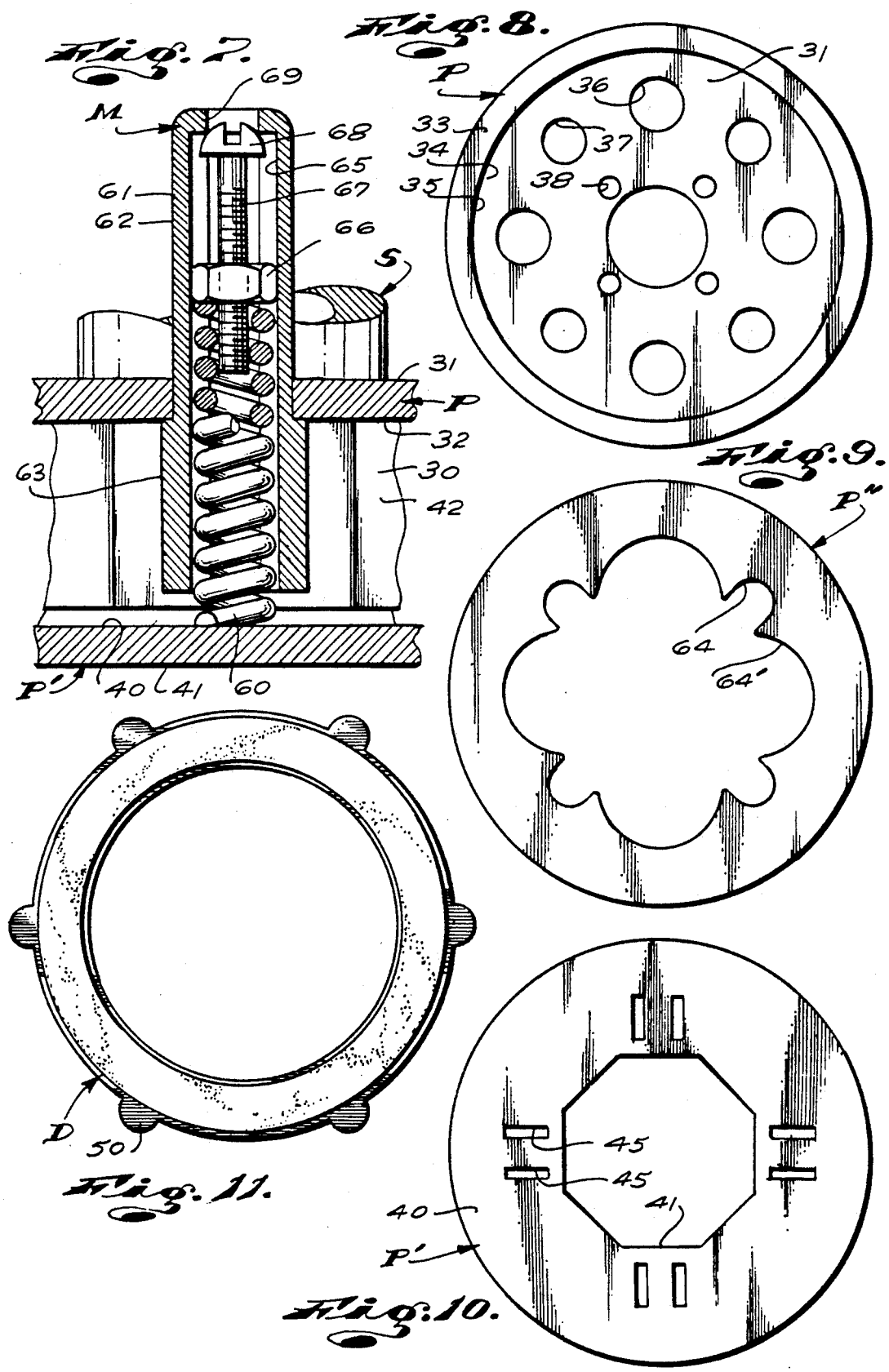

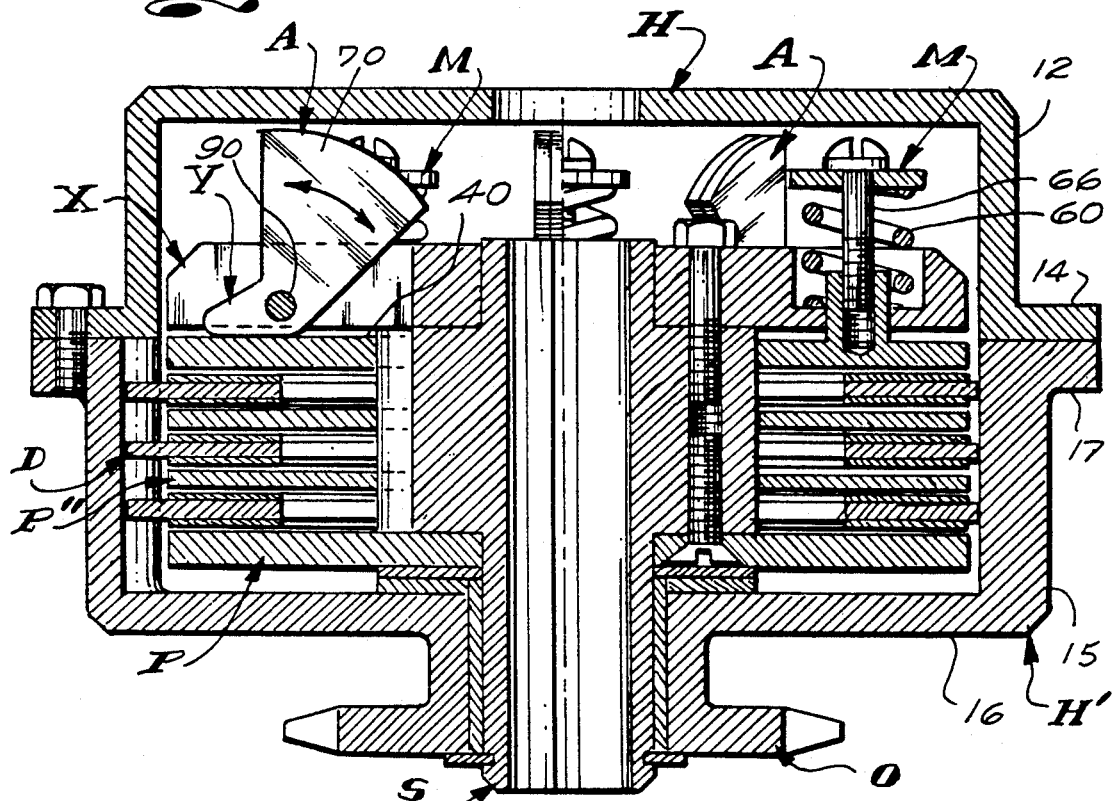
Fig. 12. —PRIOR ART—
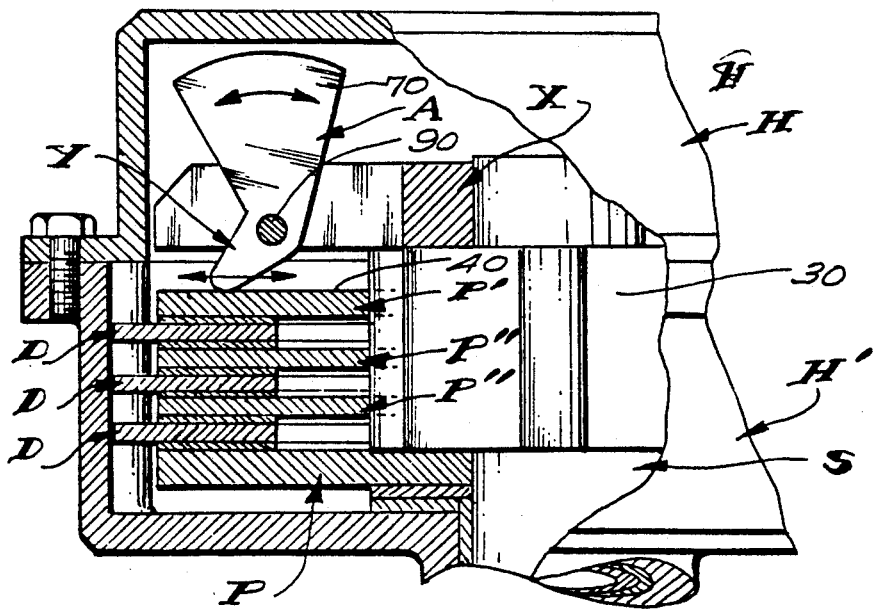
Fig. 13. —PRIOR ART—

CENTRIFUGAL CLUTCH

BACKGROUND OF THE INVENTION

The art of centrifugal clutches of the type and/or class here concerned with is old and highly developed.

While the details of construction of prior art clutches varies widely, the basic mechanical aspects and functions of such clutches has been substantially standardized.

The basic structure and mechanics that characterize prior art clutches includes an elongate central rotary power input shaft with front and rear ends and a plurality of axially spaced plates in rotary driving engagement about the shaft with the rearmost plate in fixed axial position on the shaft and the remainder of the plates being shiftable axially of the shaft; an elongate rotary power output part is engaged about the shaft and the plates; a plurality of axially spaced disks in rotary driving engagement and shiftable axially of the drive part are interengaged between the plates. The clutches are next provided with actuating means to normally yieldingly urge and hold the interengaged plates and disks out of frictional rotary driving engagement with each other when the clutch rotates at a low rate and to urge the plates and disks into driving frictional engagement with each other as the rate of rotation of the clutch is increased. The prior art actuating means include a large heavy flange-like carrier part carried by the shaft and spaced axially forward of the front plate; a plurality of circumferentially spaced spring means carried by the carrier part and coupled with the front plate to normally yielding urge the plate forward; and, a plurality of circumferentially spaced normally forwardly extending actuating weights pivotally carried by the carrier part on axes normal to radial planes on which the weights are positioned; and, normally radially outwardly and axially rearwardly projecting cam arms on the weights engaging a front surface of the front plate and operating to move that plate rearwardly, against the resistance of the spring means and to urge the several plates and disks into frictional driving engagement with each other and cause the output part to rotate with the shaft.

The above-noted basic prior art centrifugal clutch structure is shown in FIGS. 12 and 13 of the accompanying drawings.

Two notable prior art embodiments of the above prior art clutch structures are disclosed in U.S. Pat. No. 3,291,274, issued Dec. 13, 1966 to R. M. Wyman and entitled "Centrifugal Clutch"; and U.S. Pat. No. 4,111,291, issued Sep. 5, 1978 to G. F. Horstaman and entitled "Centrifugal Friction Mechanism."

The principal shortcoming of the above-noted prior art clutch structure resides in the necessity to provide a special carrier part to carry the spring means and the actuating means. Those special parts are costly, heavy and space-consuming. Of greater importance is the fact that the cam arms of the actuating weights slidably move radially inwardly and outwardly relative to their opposing surface of their adjacent related plate. The relative sliding movement between the weight cams and the plates occurs repeatedly to varying extent and under varying pressures during normal use and operation of the clutches. The movement between the weight cams and the plates creates frictional drag that slows and adversely affects operation of the clutches and often results in adverse wear of the parts that causes the clutches to "hang up" or otherwise fail to operate as intended.

The foregoing shortcomings that characterize most prior art centrifugal clutches of the character here concerned with have been accepted by the prior art as those disadvantages that must be incurred in exchange for the advantages that are sought to be attained through the use of such clutches.

OBJECTS AND FEATURES OF THE INVENTION

It is an object and a feature of my invention to provide an improved centrifugal clutch structure of the class here concerned with wherein the actuating weights pivotally engage a clutch plate with which they are related, thereby eliminating the cam parts that characterize prior art clutches and that adversely affect the operation thereof.

Another object of the invention is to provide an improved clutch of the general character referred to above wherein the actuating plates are related to and pivotally engage an axially stationary clutch plate at one end of a series of axially spaced interengaged plates and disks and that are coupled to an axially shiftable plate at the other end of the series of interengaged plates and disks whereby that axially shiftable plate is pulled axially toward the axially fixed plate by operation of the weights when the clutch is rotated at a rate that causes the weights to pivot relative to the fixed plate (by centrifugal forces acting upon them).

Yet another object and feature of the present invention is to provide a clutch of the general character referred to above that includes spring means carried by the fixed plate and that engage the above-noted axially shiftable plate to normally yieldingly urge the shiftable plate away from the fixed plate.

It is an object and feature of the invention to provide an improved clutch of the general character referred to above wherein the actuating weights are flat plate-like parts positioned on radial planes through the central axis of the clutch and that have radially outwardly and axially rearwardly disposed pivot points that are engaged in opposing radially inwardly and axially forwardly disposed pivot seats on the fixed plate; and, that includes an elongate substantially axially extending tow member related to each weight and having one end connected with the weight at a point spaced radially inward and axially forward of its pivot point and its other end connected with said axially movable plate.

It is yet another object of the present invention to provide a clutch of the general character referred to above that eliminates the need to provide that carrier part that characterizes clutch structures of the prior art.

The foregoing and other objects and features of the invention will become apparent and will be fully understood from the following detailed description of one preferred form and embodiment of my invention throughout which description reference is made to the accompanying drawings.

DESCRIPTION OF THE DRAWINGS

FIG. 1 is an isometric view of a clutch embodying my invention;

FIG. 2 is an enlarged detailed sectional view taken substantially as indicated by Line 2—2 on FIG. 1;

FIG. 3 is a detailed sectional view taken substantially as indicated by Line 3—3 on FIG. 2;

FIG. 4 is a view showing parts of the structure illustrated in FIG. 3 in different positions;

FIG. 5 is a sectional view taken substantially as indicated by Line 5—5 on FIG. 4;

FIG. 6 is a view taken as indicated by Line 6—6 on FIG. 5;

FIG. 7 is an enlarged detailed sectional view taken substantially as indicated by Line 7—7 on FIG. 3;

FIGS. 8, 9 and 10 are plan views of three forms of plates utilized in the invention;

FIG. 11 is a plan view of a disk;

FIG. 12 is a cross-sectional view of a prior art clutch mechanism; and,

FIG. 13 is a view showing parts of the prior art clutch in different positions.

DETAILED DESCRIPTION OF THE INVENTION

The clutch structure C illustrated in the accompanying drawings is not presented in any particular scale and liberties have been taken as regards details of design and construction in order to best illustrate the nature and character of the invention.

At the present time I am producing and selling a clutch embodying the present invention for use in go-carts and the like. That clutch is approximately 4" in outside diameter, approximately 2½" in axial extent and weighs about 2 pounds.

The small dimensions and relative proportioning of the parts of the clutch that I make are such that they do not lend themselves to accurate illustration for the purpose of this disclosure.

My new clutch C, as shown in the accompanying drawings, includes a central tubular rotary input shaft S with front and rear ends 10 and 11. For the purpose of this disclosure, I have elected to show the shaft S as being coextensive with the longitudinal extent of the clutch and such that a drive shaft S' of a prime mover can be suitably drivingly engaged with either end of the shaft, as desired or as circumstances might require. The means that might be employed to connect the shafts S and S' can vary widely in form and construction without departing from the spirit of my invention. In the case illustrated, the shaft S' is slidably engaged in the shaft S and is keyed thereto.

The clutch C next includes an elongate case that is positioned about and that is substantially coextensive with the shaft S. The housing is a sectional structure and is shown as including front and rear sections H and H'. The front section H has a cylindrical outer wall 12, a radially extending front wall 13 and a rear, radially outwardly projecting coupling flange 14. The rear section H' has a cylindrical outer wall 15, a radially extending rear wall 16 and a front coupling flange 17.

The sections H and H' are arranged in axial alignment with their flanges 14 and 17 in opposing engagement. The flanges 14 and 17 are releasably secured together by an annular series of cap screws 18, as clearly illustrated.

In the form of the invention illustrated, the end wall 16 of the housing section H' is formed with an axially rearwardly projecting tubular extension 19 that is formed with or otherwise carries a rotary output part O. The output part O can be a gear, a wheel for a suitable belt drive or can, as shown, be a sprocket for a chain drive.

The extension 19 has an enlarged bore 20 entering its rear end and in which a shaft bearing 21 is engaged to rotatably center and support the housing H' on and about the shaft S. An oil seal 22 is shown engaged in the bore rearward of the bearing to seal between the shaft and the bore. The bearing and seal are retained in the bore by a snap ring 23.

The rear housing section H' next includes a plurality of circumferentially spaced longitudinally extending radially inwardly opening drive grooves or channels 24.

In the form of the invention illustrated, the front housing section H is shown provided with an extension 19' similar to the extension 19 on the housing section H' and in which the forward end of the shaft S is entered and in which a bearing 21', oil seal 22' and snap ring 23' are engaged to rotatably support the housing section H on the shaft S and to seal between the shaft and the housing.

With the structure thus far described, it will apparent that either end of the shaft S can be advantageously engaged or coupled with the drive shaft of a related prime mover.

In practice, if only the rear end 11 of the shaft S is to be engaged with a related drive shaft, the forward end portion of the shaft S is removed and the extension 19' on the housing section H and the bearing; seal and snap ring otherwise provided for the forward end of the shaft S are eliminated. Such modification clutch housing and shafts are old in the art and is shown in FIG. 12 of the drawings. In such a case, a central shaft receiving opening is provided in the front wall 13 of the housing section H through which a drive shaft can be extended to engage the shaft S, if circumstances require.

The front wall 13 of the housing section H is formed with a pair of circumferentially spaced oil fill and drain openings 25. The openings 25 are normally closed by removable plugs 26. When it is desired to fill the housing with oil, the housing is positioned with its axis horizontal and is manually rotated to position the openings 25 so that upon removing the plugs 26 and introducing oil into the housing through one opening 25 until oil commences to flow out through the other opening 25, a proper volume of oil is deposited within the housing. Thereafter the plugs 26 are reengaged in the openings 25. To facilitate the foregoing operation, the front wall 13 of the housing can be provided with oil fill lines 27 to facilitate proper rotary orientation of the housing.

In practice, if the clutch is a dry clutch and no oil is to be used, the oil seals 22 and 22', the plugs 26 are eliminated and the housing is provided with suitable air circulating openings, in accordance with common practices.

The shaft S is shown formed with an enlarged hub portion 30 that occurs within the housing and with which a plurality of flat, axially spaced, radially outwardly projecting annular plates, with flat front and rear surfaces are related.

In the case illustrated, the clutch includes four plates, there being a front end plate P, a rear end plate P' and two intermediate or floater plates P". The front end plate P is the drive plate and is carried by the shaft S (hub 30) in rotary driving and fixed axial position relative thereto. In the form of the invention illustrated, the shaft is screw fastened to the front end of the hub 30; though it might be formed integrally therewith or might be welded or otherwise secured to the shaft.

The front end plate P has axially forwardly and rearwardly disposed front and rear surfaces 31 and 32. The front surface 31 is formed with an annual axially forwardly projecting flange 33 about its outer perimeter.

The flange 33 has a radially inwardly disposed inside surface 34 that converges with the surface 31 to define a radially inwardly and axially forwardly disposed annular inside corner about the perimeter of the plate. Circumferentially spaced segmental portions of the noted corner establish radially inwardly and axially forwardly disposed pivot seats 35; which are parts of an actuating means A that will hereinafter be described.

The pivot seats 35 can be established by means other than the noted flange 32 without departing from the broader aspects and spirit of my invention.

The front end plate P next includes a plurality (4) of circumferentially spaced axially opening ports 36, each of which occurs radially inwardly of a related pivot seat 35.

The drive plate P next includes a plurality (4) of circumferentially spaced axially openings 37 that are shown space between the ports 36. The openings 37 are parts of spring means M that will hereinafter be described.

Finally, the front end plate P is formed with openings 38 to accommodate the screw fasteners employed to secure the plate to the hub portion 30 of the shaft S, as clearly shown.

A rear end plate P' is engaged about the rear end portion of the hub 30 on the shaft S and has flat front and rear surfaces 40 and 41. The exterior of the hub 30 and the inside of the plate P' are formed and interengaged to couple the hub and the plate in rotary driving engagement and for free axial shifting relative to each other. The coupling means connecting the plate P' and the hub 30 can vary widely in form and is shown as including a plurality of elongate axially extending and circumferentially spaced radially inwardly and outwardly disposed flats 41 and 42 within the plate P' and about the hub 30. The opposing flats 41 and 42 are such that they establish rotary driving engagement between the plate P and the hub, while allowing free axial shifting of those parts relative to each other.

In practice, the above-noted flats 41 and 42 can be replaced by various other means such as spline type coupling means, key and key-way type coupling means and the like, without departing from the broader aspects and spirit of my invention.

The rear end plate P' next and finally includes a plurality (4) of circumferentially spaced pairs of elongate coupling slots 45. Each pair of slots 45 is axially aligned with a related port 36 in the front end plate P. The slots 45 of each pair of slots extend radially of the plate P' and are in lateral, parallel spaced relationship from each other.

The plate P' is that plate that is forcibly moved axially during operation of the clutch and that is commonly referred to and will sometimes hereinafter be called the pressure plate.

The two intermediate plates P'', commonly referred to as floater plates, are freely engaged about the hub 30 of the shaft S in axial spaced relationship with each other and from and between the plate P and plate P'. The floater plates P'' are rotatably driven with the shaft S and are shiftable axially relative thereto. The plates P'' can be coupled with the hub portion 30 of the shaft S in the same manner that the plate P' is coupled therewith or can be rotatably driven, with the shaft, by means of circumferentially spaced drive parts carried by and projecting axially rearwardly from the plate P and engaged in openings or recesses formed in the plates P'', as shown in the drawings and as will hereinafter be described.

The clutch A next includes a plurality (3) of axially spaced radially extending annular friction disks D with flat front and rear surfaces. The foremost disk D occurs between the drive plate P and its next adjacent floater plate P''; the rear most disk D occurs between the pressure plate P' and its next adjacent floater plate and the intermediate disk occurs between the two floater plates, as clearly illustrated throughout the drawings.

In accordance with common practices, the disks can be and are shown as having plate-engaging friction pads suitably fixed to their front and rear surfaces. The nature and character of the friction pads and the means employed to secure them to their related disks is well known to all of those skilled in the art and needs no further explanation or description.

The alternating interengaged relationship of the several disks and plates is sometimes described as "leafed engagement" and the assembly of interrelated plates and disks is often described as the stack (of disks and plates).

The clutch next includes coupling means to couple the outer peripheral portions of the disks D with their related side wall 15 of the housing section H' in rotary driving engagement and for free axial shifting relative thereto. The coupling means can vary widely in practice without departing from the broader aspects and spirit of my invention. For example, the coupling means can be similar to the first noted coupling means provided to couple the plate P' and hub 30 of the shaft S or can, as shown, consist of the plurality (4) of circumferentially spaced radially inwardly opening axially extending drive channels 24 in the side wall 15 of the housing and a plurality (4) of circumferentially spaced radially outwardly projecting drive lugs 50 on and about the disks D and entered into the channels 24 with suitable working clearance therewith.

The clutch A next includes spring means M to normally yieldingly urge the rear end pressure plate P' axially rearward and away from the front end plate P so that no frictional driving engagement is established between the several plates and their related disks.

The spring means M is shown as including a plurality (4) of elongate circumferentially spaced axially extending helical compression springs 60 suitably carried by the forward drive plate P and extending rearwardly therefrom and engaging the front surface 40 of the rear pressure plate P'. The springs are biased to urge the plate P' rearwardly from the plate P.

In the preferred embodiment of my invention and as shown in the drawings, the means M includes cartridge-like carriers 61 with elongate cylindrical front portions 62 that extend through the openings 37 in the plate P and project freely forwardly from the front surface 31 thereof; and, elongate cylindrical rear post-like portions 63, larger in diameter than the front portions 62, that project axially rearwardly from the plate P to terminate in close proximity to the front surface of the plate P'. The rear portions of the front portions 62 of the spring carriers or cartridges 61 are press-fitted in their related openings 37. The front end of the rear post portions of the cartridges are in stopped seated engagement with the rear surface 32 of the plate P.

The post portions 63 of the cartridges 61 are drive posts for the floater plates P''. The posts 63 occur radially inward of the inner perimeter portions of the plates P'' and the plates P'' are formed with axially and radially inwardly opening post-receiving drive notches 64 through which the posts extend to establish rotary driving engagement between the plate P and the plates P' while allowing for free relative axial movement thereof.

It will be apparent that the notches 64 can be openings through which the posts 63 project and the plates can be formed with radially inwardly projecting portions with drive flats to engage the flats of the hub 30 without departing from the spirit of my invention. In such a case, the post portions of the cartridges 60 are not utilized to orient and drive the plates P''.

The cartridges 60 have elongate longitudinally extending rearwardly opening polygonal openings 65 in which the springs 60 is slidably engaged. A polygonal (hexagonal) nut 66 is slidably engaged in the opening of each cartridge, axially forward of the spring 60 therein and an elongate screw 67 is engaged through each nut to extend axially forwardly therefrom and has an enlarged tool-engaging head 68 at its forward end. The heads 68 on the screws establish axial stopped rotary bearing engagement with rearwardly disposed annular stops 69 formed in the forward ends of the cartridges.

By turning the screws by means of a screwdriver or the like, the nuts are advanced forwardly or rearwardly to adjust the biasing of the springs, as desired or as circumstances require.

In practice, the front wall 13 of the housing is provided with at least one opening that can be registered with the cartridges of the means M and through which a screwdriver or the like can be engaged to effect adjustment of the springs of the means M, without resorting to dismantling of the clutch structure. In the case illustrated, the oil fill openings 25 are positioned to serve the above end.

The clutch A of the present invention next and finally includes actuating means A to draw or pull the rear end pressure plate P' axially forward toward the front end drive plate P and to thereby move the stack of plates and disks into pressure frictional driving engagement with each other and to effect rotary driving of the housing and sprocket O with the shaft S, when the rate of rotation of the shaft is increased beyond an idle speed at which the plates and disks of the stack are held out of frictional driving engagement with each other by the means M. The means A includes the above-noted radially inwardly and axially forwardly disposed pivot seats 35 at the front surface 31 of the front end plate P. In addition to the noted pivot seats 35, the means A includes a plurality (4) of substantially flat platelike actuating weights 70 positioned in the housing forward of the front drive plate P and arranged to occur on longitudinally extending radial planes within the construction. Each weight is related to and is in radial alignment with one of the pivot seats 35.

The weights 70 have front, rear, inner and outer edges 71, 72, 73 and 74. The rear edges of the weights normally oppose and establish stopped bearing engagement on the front surface 31 of the plate P. The rear edges 72 and outer edges 74 of the weighs converge to the define radially outward and axially rearwardly disposed pivot points or corners 65 that engage in the pivot seats 35 with which the weights are related, as clearly shown in FIGS. 3 and 4 of the drawings.

In accordance with common practices, the weights 70 can be and are shown as being established by a plurality (3) of thin plate-like parts of predetermined weight and such that by adding or subtracting the number of weight parts; by making the weight parts of materials having different densities or by removing stock from the weight parts to change the weight thereof, the mass or weight of the weights 70 can be varied and adjusted as desired or as circumstances might require.

As shown, the weights 70 project a substantial distance forward from the plate P and their centers of gravity are spaced forward and radially inward from their pivot points 75 and their related pivot seats 35.

It will be apparent that as the shaft S, plate P and weights 70 subassembly is rotated, centrifugal forces acting on the weights tend to cause them to cast radially outward into stopped engagement in and with their related pivot seats. As the rate of rotation of the noted subassembly increases and the centrifugal forces acting upon the weights increases, the weights pivot forwardly and radially outwardly about their pivot seats and away from the front surface 31 of the plate P, as shown in FIG. 4 of the drawings.

The actuating means A next includes elongate substantially axially extending tow parts 80 with front and rear ends extending axially between the weights 70 and the rear end pressure plate P'. The front and rear ends of the tow parts 80 are suitably pivotally connected with their related weights and with the plate P' so that when the weights pivot forwardly and outwardly, as noted above, the tow parts 80 are pulled or drawn forward and tow or pull the plate P' forwardly to urge the stack of plates and disks into pressure frictional driving engagement with each other.

The form of tow parts 80 and the means provided to pivotally couple the ends thereof to the weights and pressure plate can vary widely in form and construction.

In the form of the invention illustrated, the tow parts 80 are elongate U-shaped strap-like parts with parallel legs 81 and transversely extending bases 82 at the rear ends of the legs. The bases 82 engage the rear surface 41 of the plate P', between their related pair of slot openings 45 and the legs 81 project forwardly through the openings 45 and extend to their related weights with which they are coupled.

In practice, the bases 82 can bear directly on the rear surface of the plate P' or, as best seen in FIGS. 5 and 6 of the drawings, effect-bearing engagement with the plate through one or more shims 83 that are engaged between the plate P and the bases 82, between the legs 81. The shims 83 are flat T-shaped metal parts with elongate radially extending portions that occur between the bases 82 and the plate P' and transversely extending cross parts at their radial inner ends that extend between and stop against rear edges of the legs 81 to prevent the shims from being cast radially outward from operating position by centrifugal forces acting upon them.

It will be apparent that the shims 83 are effective for adjusting the axial distance between the plates P and P' and to compensate for wear of the plates and disks.

It will be apparent that when the weights 70 and tow part 80 move from their normal unactuated position shown in FIG. 3 of the drawings to their actuated position shown in FIG. 4 of the drawings, the tow parts 80 pivot radially outward relative to the plate P', about the lateral extending rear edges of their bases 82.

The forward end portions of the legs 81 of the tow parts 80 extend freely through the port 36 in the front end plate P to occur at opposite sides of their related weights 70, as clearly shown in FIG. 5 of the drawings. The front end portions of the legs 81 are formed with elongate longitudinally extending key hole slots 83 with large diameter head-receiving rear end portions. The weights 70 are formed with laterally extending pin-receiving openings 76 that normally register with the forward end portions of the key hole slots in the legs. The openings 76 are spaced rearward from the center of gravity of the weights and radially inward from their pivot points 75. Elongate double headed or "dumbbell" pivot pins 90 are engaged through the registering openings 76 and slots 83 and pivotally coupled the weights and tow parts together. The heads of the pins 90 occur outward of the legs 80 and prevent displacement of the pins during normal operation and use of the clutch.

In the form of the invention illustrated, the openings 76 in the weights 70 are slot openings that extend radially inward and open at the inner edges 73 of the weights and such that the weights can be moved into and out of engagement between the legs 80 of the tow part and with the pins 90 by manually pulling the outer portions of the weights forwardly so as to disengage their pivot points from engagement in their related pivot seats. With the pivot points and seats disengaged, the weights can be slid radially outward and removed. In practice, to facilitate the foregoing, the shims 73 can be disengaged from between the base 72 of the tow parts and the plate P'. With the shims removed, the stack of plates and disks can be manually compressed, against the resistance of the spring means M a sufficient distance to allow substantial free movement of the weights into and out of engagement between the legs of the tow part and the pin.

It is sometimes necessary or desirable that the radial inner end portions of the weights be prevented from shifting laterally and becoming so misaligned that operation of actuating means is adversely affected. Accordingly, the clutch can be and is shown as including a weight oriented ring 95 with circumferentially spaced pairs of elongate laterally spaced radially outwardly and forwardly projecting guide fingers 96 that occur at opposite sides of the rear inner portions of the weights. The ring 95 is engaged about the shaft S to occur adjacent the front surface of the front end plate P and is held in place by the fasteners that serve to secure the plate P to the hub 30 of the shaft.

Referring to FIG. 9 of the drawings, the plates P" are relieved as at 64' to accommodate the tow parts 80. If desired, the plates P" could be provided with openings similar to the port openings 36 in the front end plate P to accommodate the tow parts 80 without departing from the broader aspects and spirit of my invention.

In FIGS. 12 and 13 of the drawings, I have illustrated a clutch structure that includes that relationship of plates and disks and those spring means and actuating means that are commonly employed in and that characterize most prior art centrifugal clutches of the class here concerned with. The prior art structure illustrated is intended to approximate the clutch structure of my invention as shown in FIGS. 1 through 11 of the drawings and those parts of the prior art structure that correspond with parts of my new clutch structure are identified by the same reference numerals and characters for the purpose of comparison.

It is to be noted that the drive plate P in the prior art structure is secured to the rear end of the hub 30 of the shaft S and the axially movable pressure plate P' is forward of the plate P and is about the forward end of the hub 30 of the shaft S.

The spring means M of the prior art clutch includes axially forwardly projecting posts on the pressure plate P'; elongate adjusting screws 66 engaged in posts on the plate P' to project forwardly therefrom; axially extending helical compression springs 60 with front ends engaged by the heads of the screws and with rear ends that oppose and react against a large heavy disk-like carrier part X carried by the shaft in fixed axial and rotary engagement therewith and that overlies the front surface of the reaction plate P'.

The actuating means A of the prior art clutch illustrated in the drawings includes actuating weights 70 disposed similarly to the weights 70 in my new clutch, but that are pivotally supported within slot openings in the carrier plate X by pivot pins 90. The weights 70 of the prior art structure have radially outwardly projecting arm-like cams Y at their rear portions that react against the front surface of the pressure plate P' to move that plate axially rearwardly toward the plate P when the weights are caused to pivot outwardly by centrifugal forces; as clearly shown in FIG. 15 of the drawings.

It is to be particularly noted that the weights 70 of the prior art clutch pivot outwardly and inwardly substantially continuously during normal operation and use of the clutch and that the cams Y shift radially inwardly and outwardly in pressure bearing engagement on the front surface of the pressure plate in such a manner that frictional drag between those parts is created to slow operation of the clutch and in such a manner as to cause the cam and plate to wear excessively and in such a manner as to ultimately prevent uniform and dependable operation of the clutch.

Upon comparing the above-noted prior art clutch with my new clutch, it is to be first noted that the carrier part X that characterizes the prior art clutch has been eliminated in my new clutch, thereby notably reducing the weight, size and cost of my new clutch. Next, is to be particularly noted that in the prior art clutch the cams on the weights forcibly bear and slide back and forth across their related opposing surface of the pressure plate (with unavoidable adverse effects) while in my new clutch, the weights have pivot points that pivot in pivot seats in the drive plate P, with little appreciable wear and substantially no drag. In the prior art clutch, the pressure plate at the forward end of the stack of plates and disks is moved rearwardly to urge the pressure and floater plates and the disks rearwardly into frictional driving engagement with each other and with the drive plate. In my new clutch, the rear pressure plate is drawn axially forwardly toward the forward pressure plate P by means of the tow parts that extend axially through the stack of plates and disks. The tow parts are drawn axially forward by the weights that react rearwardly against the drive plate P.

In accordance with the above, it is believed apparent that my new clutch includes a novel combination and relationship of parts having a new and novel rule of action that is in no way taught or suggested by the basic combination and relationship of parts and the rule of action of the typical prior art clutch structure that I have illustrated for purposes of comparison.

Having described only one typical preferred form and application of my invention, I do not wish to be limited to the specific details herein set forth but wish to reserve to myself any modifications and/or variations that might appear to those skilled in the art and which fall within the scope of the following claims.

Having described my invention, I claim:

1. A clutch including an elongate housing with front and rear end walls and an axially extending outer side wall; a rotary power output part axially outward of and in rotary driving engagement with one end of the housing; an elongate power input shaft concentric with the housing and having a power input end accessible at one end of the housing; bearing means coupling the housing and shaft for free relative rotation; a drive plate with front and rear surfaces carried by the shaft and projecting radially outwardly therefrom within the housing; a pressure plate with flat front and rear surfaces within the housing and spaced rearward from the drive plate, drive plate coupling means coupling the pressure plate with the shaft in rotary driving and axial shifting engagement therewith; a radially extending friction disk positioned between the drive and pressure plates; disk coupling means coupling the disk in rotary driving and axial shifting engagement with the housing; spring means normally yieldingly urge the pressure plate rearwardly and away from the drive plate and disk; and, actuating means to move the pressure plate forward into pressure engagement with the disk and to move the disk forwardly into pressure engagement with the drive plate; said actuating means includes circumferentially spaced radially inwardly and axially forwardly disposed pivot seats at the front surface of the drive plate; an actuating weight related to each pivot seat and extending radially inwardly and projecting axially forward therefrom, each weight has a radially outwardly and axially rearwardly disposed pivot point engaged in the pivot seat; each weight has a center of gravity spaced radially inward and forward from its pivot point; and, an elongate tow part with front and rear ends extending rearwardly from each weight to the pressure plate; a front coupling means coupling the front end of each tow part to its related weight at a point spaced radially inward of the pivot point and axially rearward from the center of gravity of the weight; and, rear coupling means coupling the rear end of each tow part to the pressure plate.

2. The clutch set forth in claim 1 wherein the pressure plate coupling means includes a plurality of circumferentially spaced elongate axially extending drive surfaces on the shaft and circumferentially space driven surfaces on the pressure plate in opposing axially shiftable and rotary driving engagement with the drive surfaces on the shaft.

3. The clutch set forth in claim 1 wherein the disk coupling means includes a plurality of circumferentially spaced elongate axially extending drive surfaces in the housing and circumferentially spaced drive surfaces on the disk in opposing axially shiftable and rotary driving engagement with the drive surfaces in the housing.

4. The clutch set forth in claim 1 wherein the disk coupling means includes a plurality of circumferentially spaced elongate axially extending drive surfaces in the housing and circumferentially spaced drive surfaces on the disk in opposing axially shiftable and rotary driving engagement with the drive surfaces in the housing; the pressure plate coupling means includes a plurality of circumferentially spaced elongate drive surfaces on the shaft and circumferentially spaced drive surfaces on the pressure plate in opposing axially shiftable and rotary driving engagement with the drive surfaces on the shaft.

5. The clutch set forth in claim 1 wherein the tow part is an elongate U-shaped part including elongate laterally spaced longitudinally extending legs and a transversely extending base between the rear ends of the legs, the rear coupling means includes pairs of laterally spaced openings in the pressure plate through which the legs are freely engaged with the base in bearing engagement with the rear surface of the pressure plate, the front coupling means includes axially aligned coupling pin openings in the legs and in the weights and coupling pins engaged through the pin openings.

6. The clutch set forth in claim 1 wherein the tow part is an elongate U-shaped part including elongate laterally spaced longitudinally extending legs and a transversely extending base between the rear ends of the legs, the rear coupling means includes pairs of laterally spaced openings in the pressure plate through which the legs are freely engaged with the base in bearing engagement with the rear surface of the pressure plate, the front coupling means includes axially aligned coupling pin openings in the legs and in the weights and coupling pins engaged through the pin openings; the legs of the tow parts occur at opposite sides of their related weights, the coupling pin openings in the weights are radially inwardly and laterally slot openings, the coupling pins have elongate laterally extending central portions slidably engaged in the openings in their related legs and weights and have parts at their opposite ends that occur laterally outward of the openings in the legs.

7. The clutch set forth in claim 1 wherein said spring means includes a plurality of circumferentially spaced spring means openings in the drive plate, elongate spring carrier parts with rear end portions engaged through and projecting forwardly from each spring means opening and rear post portions projecting axially rearward from the drive plate, each carrier part has a central longitudinally extending polygonal shaped opening and an annular stop at its front end, a polygonal nut in rotary driving and axially shiftable engagement in the polygonal opening, an elongate axially extending screw engaged through the nut and having a tool engaging head in stopped engagement with the stop and an elongate axially extending compression spring with front and rear ends engaged in the polygonal opening with its front end stopped against the nut and with its rear end in yielding pressure engagement with the front surface of the pressure plate.

8. The clutch set forth in claim 1 wherein the pivot seats at the front surface of the drive plate are defined by segmental portions of an annular axially forwardly projecting flange on the drive plate and having a radially inwardly disposed surface that converges with the front surface of the drive plate.

9. The clutch set forth in claim 1 wherein the drive plate is formed with circumferentially spaced axially opening tow ports through which the tow parts freely extend.

10. A clutch including an elongate housing with front and rear end walls and an axially extending outer side wall; a rotary power output part spaced axially from and drivingly connected with one end wall of the housing; an elongate central power input shaft within the housing and having a power input end accessible at one end of the housing; bearing means coupling the shaft and housing for free relative rotation; a drive plate with front and rear surfaces carried by and projecting radially outward from the shaft within the housing; a pressure plate with front and rear surfaces within the housing in rearward spaced relationship from the drive plate; a pressure plate coupling means coupling the pressure plate to the shaft in rotary driving and axial shiftable relationship therewith; floater plates within the housing in axial spaced relationship between the drive and pressure plate; floater plate coupling means coupling the floater plates with the shaft in rotary driving engagement and for free axial shifting relative thereto; axially spaced radially extending friction disks within the housing, each disk extending radially between a related pair of adjacent plates, disk coupling means coupling the disks with the housing in rotary driving and axial shifting engagement therewith; elongate spring means carried by and projecting rearwardly from the drive plate and engaging and normally yieldingly urge the pressure plate rearwardly and away from the drive plate, floater plates and disks; and, actuating means to draw the pressure plate forwardly and to move the several plates and disks into frictional driving engagement with each other, said actuating means includes a plurality of circumferentially spaced radially inwardly and axially forwardly disposed pivot seats on the front surface of the drive plate, a plurality of weights on circumferentially spaced axially extending radial planes within the housing forward of the drive plate, said weights have radially outwardly and axially rearwardly disposed pivot points engaged in related pivot seats and having centers of gravity spaced axially forward of their pivot points, an elongate axially extending tow part with front and rear ends related to each weight, front coupling means coupling the front end of each tow part with its related weight at a point spaced rearward from its center of gravity and radially inward from its pivot point, and rear coupling means coupling the rear end of each tow part with the pressure plate.

* * * * *